United States Patent [19]

Titmas et al.

[11] Patent Number: 4,985,976

[45] Date of Patent: Jan. 22, 1991

[54] METHOD OF MAINTAINING THE AVERAGE OVERALL SHARPNESS OF THE BLADES IN A SHREDDING DEVICE AND APPARATUS

[76] Inventors: James A. Titmas, 347 Crain Ave., Kent, Ohio 44240; Phillip J. Flauto, 2205 E. Streetsboro Rd., Hudson, Ohio 44326

[21] Appl. No.: 443,506

[22] Filed: Nov. 30, 1989

[51] Int. Cl.[5] ...................... B02C 18/08; B02C 18/18; B23P 6/00

[52] U.S. Cl. ................................ 29/402.08; 29/426.1; 241/30; 241/277; 241/287.1

[58] Field of Search ........... 29/402.01, 402.03, 402.08, 29/426.1, 700, 277, 287.1; 241/30

[56] References Cited

U.S. PATENT DOCUMENTS 4,151,794 5/1979 Burkett ................................ 100/74

4,389,022 6/1983 Burk .................................... 241/275

4,398,673 8/1983 Gonnason .............................. 241/5

*Primary Examiner*—Timothy V. Eley

*Attorney, Agent, or Firm*—Renner, Kenner, Greive, Bobak, Taylor & Weber

[57] ABSTRACT

A trash shredding device (10) includes an annular drum (41) which carries vertically spaced segmented blade members (47) in tracks (48) formed therein. A paddle (44) rotates within the drum (41) with its radially outer end (46) being adjacent to the blade members (47). Trash is introduced at one axial end of the paddle (44) and is forced against the blade members (47). The trash shredded by this action is discharged from the device (10) at the other axial end of the paddle (44). The average overall sharpness of the blade members (47) is maintained by placing a new blade member (47) in the first of the tracks (48) while at the same time removing the oldest of the blade members (47) from the last of the tracks (48).

11 Claims, 7 Drawing Sheets

METHOD OF MAINTAINING THE AVERAGE OVERALL SHARPNESS OF THE BLADES IN A SHREDDING DEVICE AND APPARATUS

TECHNICAL FIELD

This invention relates to the chopping and shredding of solid waste materials. More particularly, this invention relates to a shredding device and its method of operation which will maintain an overall consistency of the sharpness of the cutting blades by replacing the dullest blades with new blades without disruption to the operation of the device.

BACKGROUND ART

In the processing of solid wastes, very little can be done in exercising usual industrial process techniques because the "raw" supply is too erratic in volume, components, size, consistency, and content. Attempts to blend and average the supply have included the use of very large chambers worked with overhead cranes in an attempt to mix the stock, live bottom mixers, rotating drums, and shredders. While shredders have achieved a certain level of the desired effectiveness to produce a uniform conveyable product, they are inconsistent, prone to contaminate the surrounding area with dust, odors, and hazardous and toxic chemicals, and experience significant down time when it is necessary to perform maintenance on the cutting edges. It is imperative that the blades remain sharp, otherwise items such as plastic milk bottles escape the shredders and remain in the process stream plugging conveyances and deterring further processing of the solid wastes.

While solid wastes shredders continue to be plagued with these hardships, other equipment in other industries have partially corrected those problems by placing the working blade edges on the outside perimeter of the device with the intent of producing an end product of smaller, manageable, and uniform size. Burkett U.S. Pat. No. 4,151,794, Burk U.S. Pat. No. 4,389,022, and Gonnason U.S. Pat. No. 4,398,673 are representative of such attempts. The Gonnason patent discloses replaceable cutters fixed to the interior outside face of that gypsum ore shredding unit, but does not contemplate a device capable of replacing or sharpening the working pieces without taking the unit out of service. Similarly, the Burkett and Burk patents are deficient in this regard. While both provide for adjustments to peripheral cutting faces, neither can fully service and maintain the units without ultimately taking them out of service.

As a result of the above described shortcomings, the efficient processing of solid wastes continues to languish, preventing or inhibiting the application of traditional industrial processing techniques. Due to the peculiar nature of solid waste as a highly variable feed stock and the absence of an effective means of correcting that problem, solid waste continues to accumulate faster than it can be processed for re-use.

DISCLOSURE OF THE INVENTION

It is thus a primary object of the present invention to provide a shredding device and its method of operation in which the cutting edges can be replaced without taking the device out of service.

It is a further object of the present invention to provide a shredding device, as above, which maintains a consistent average sharpness of the cutting edges to shred solid wastes into a consistent product size.

It is another object of the present invention to provide a shredding device, as above, wherein the consistent average sharpness is maintained automatically thereby maintaining a high operating efficiency.

It is an additional object of the present invention to provide a shredding device, as above, which maintains the average sharpness by introducing new cutting edges at one end of the device while moving the existing cutting edges toward the other end of the device where the oldest cutting edge is discharged.

It is yet another object of the present invention to provide a shredding device, as above, in which the direction of movement of cutting edges is opposite to the general direction of travel of the materials to be shredded.

It is a still further object of the present invention to provide a shredding device, as above, in which the cutting edges of a shredder are continuously cooled.

It is an additional object of the present invention to provide a shredding device, as above, which contains the dust within the shredding device thereby protecting operating parts and the exterior environment.

It is yet another object of the present invention to provide a shredding device, as above, which can accommodate the controlled recycling of materials to be processed entirely within the device itself.

These and other objects of the present invention, which will become apparent from the description to follow, are accomplished by the improvements hereinafter described and claimed.

In general, a device for shredding trash or the like includes an annular drum carrying vertically spaced blade members. A paddle rotates within the drum with its radially outer end being adjacent to said blade members. Trash is introduced at one axial end of the paddle and is forced against the blade members. The trash shredded by this action is removed at the other axial end of the paddles.

The blade members can be segmental in nature with a plurality thereof carried in vertically spaced circular tracks in the annular drum. The average overall sharpness of the blade members in the shredder is maintained by placing a new segmented blade in the first of the tracks while at the same time removing the oldest of the segmented blades at the last of the tracks. Such is accomplished by removing the oldest blades from each vertically spaced track and positioning these blades adjacent to the next track closest to the last track while at the same time positioning a new blade adjacent to the first track. The removed blades are then inserted into the next adjacent tracks closest to the last track while at the same time a new blade is inserted into the first track and the oldest blade is discharged from the device.

PREFERRED EMBODIMENT FOR CARRYING OUT THE INVENTION

Figure 1:
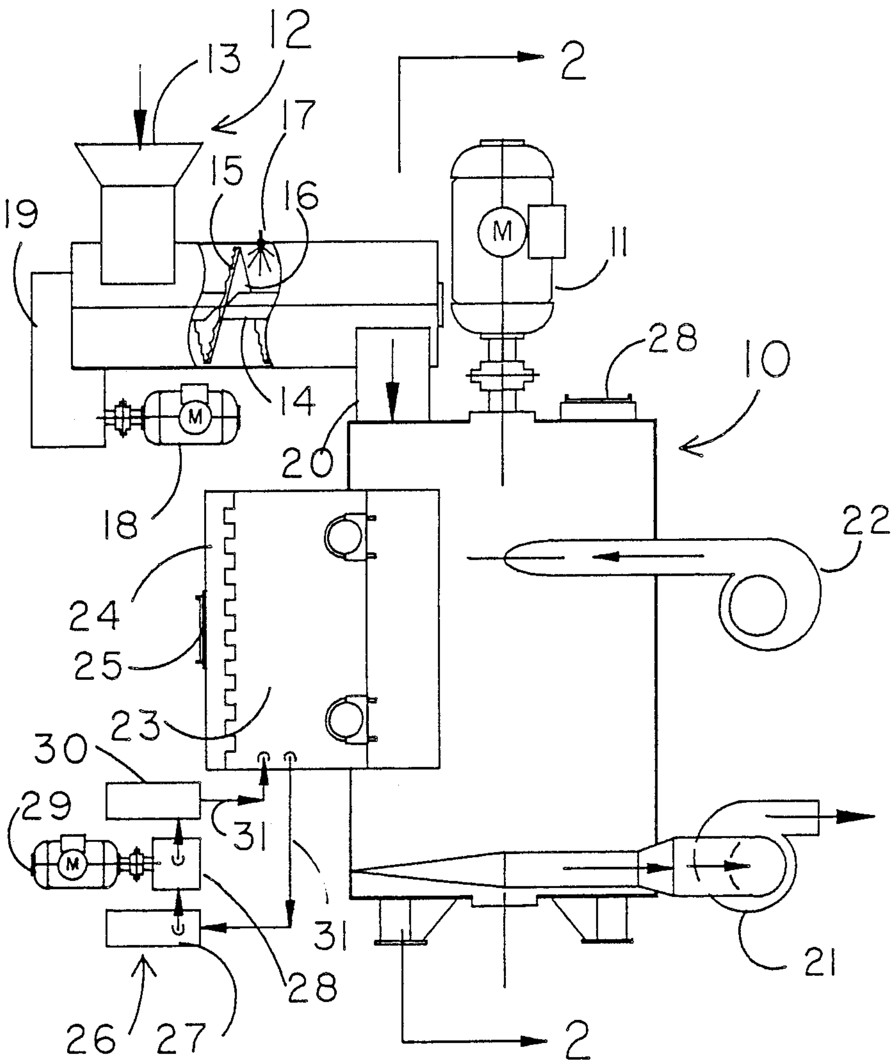
FIG. 1 is a somewhat schematic view of an overall system for processing solid waste materials showing the shredding device according to the present invention associated therewith.

An overall system for processing solid waste materials is shown in FIG. 1 as including a trash shredding unit generally indicated by the numeral 10. Shredder 10 is powered by a drive motor 11 and receives refuse through a feed mechanism generally indicated by the numeral 12. Refuse is received by a hopper 13 and is initially roughly macerated by a screw conveyor 14 preferably equipped with a serrated surface 15 to assist in maceration and a smooth forward motion surface 16. A water spray, schematically indicated at 17, can be provided to control dusting and assist in fire control and conveyance lubrication. A drive device 18 turns screw conveyor 14 through a transmission 19 delivering a continuous stream of refuse to a transfer chute 20 and thereafter into trash shredder 10.

Trash shredder 10 is schematically shown in FIG. 1 as being equipped with an induced draft blower generally indicated by the numeral 21 which conveys the shredded refuse pneumatically to further processing (not shown) and causes the interior of shredder 10 to be negative in pressure preventing dust from getting into the internal mechanical parts or escaping out feed mechanism 12.

Trash shredder 10 is also provided with a forced draft blower 22 which provides cooling for the working parts. A mechanism access housing 23 with a sealed door 24 and viewing ports 25 allow for access to and observation of the process. A conventional hydraulic pressure system, generally indicated by the numeral 26, includes the usual components of a reservoir 27, pump 28, pump drive 29, controls 30 and a multiplicity of feed and return hydraulic tubing generally indicated by the numeral 31.

Figure 2:
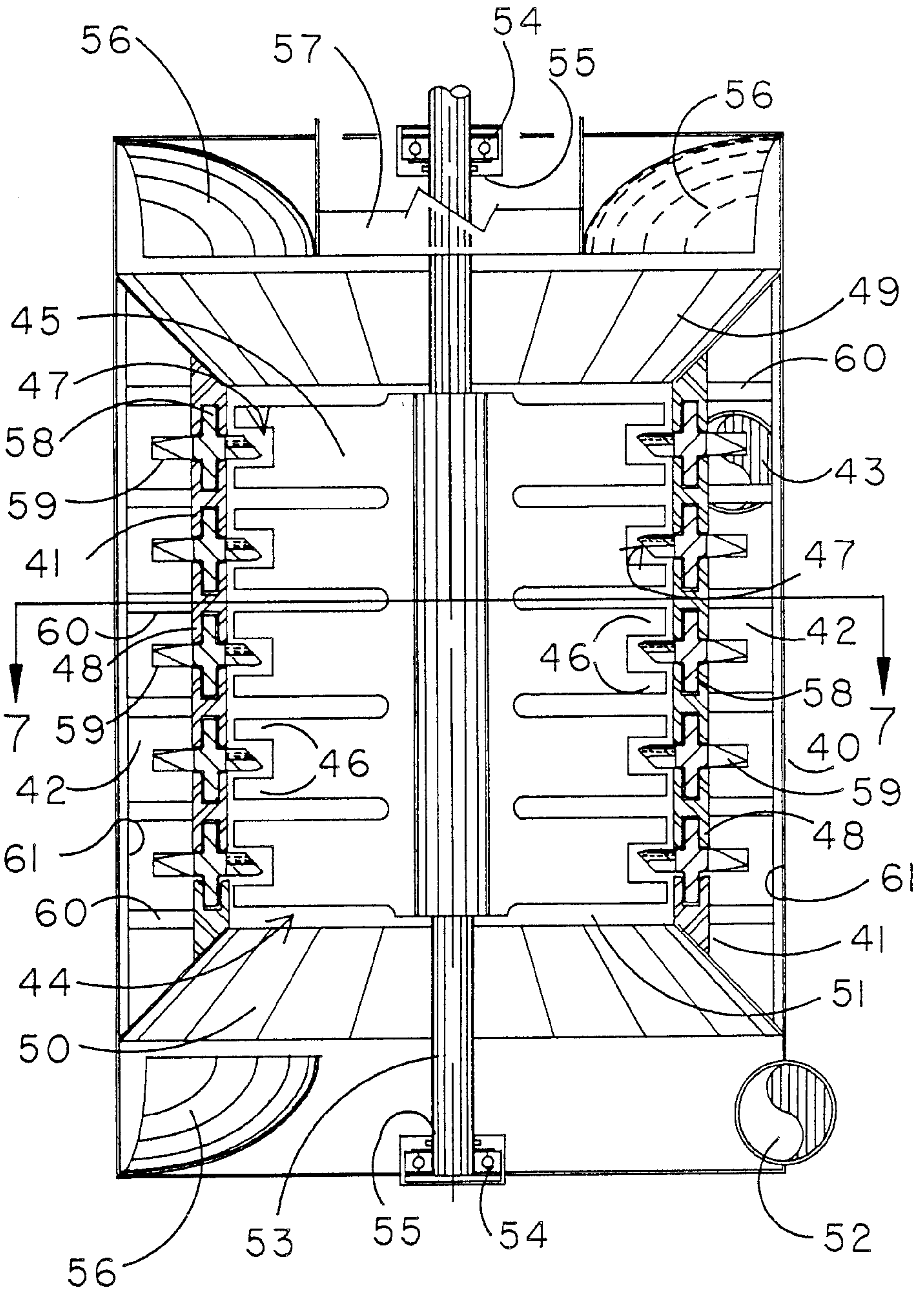
FIG. 2 is a somewhat schematic partial vertical sectional view of the shredding device according to the present invention taken substantially along line 2—2 of FIG. 1.

Some of the details of trash shredder 10 are shown in FIG. 2. Shredder 10 includes an outer housing 40 which surrounds a working drum 41 to define an annulus 42 which serves as a wind tunnel charged by blower 22 through its outlet 43 seen in end view in FIG. 2. Annulus 42 is positively pressurized above atmospheric pressure to keep the moving devices clean. The working heart of trash shredder 10 includes a rotating paddle generally indicated by the numeral 44 and having blades 45 with lugs 46 on the radially outer edge thereof. Lugs 46 pass on both sides of a plurality of segmental teeth, generally indicated by the numeral 47, that are restrained to travel in tracks 48. Tracks 48 are within working drum 41 which along with a conical inlet 49 and outlet 50 define an inner working chamber 51. Shredded trash and air leaves inner chamber 51 via the pipe outlet 52 which communicates with the induced draft blower 21 shown in FIG. 1. Blower 21 causes chamber 51 to be maintained at a pressure below atmospheric pressure. This defined inner chamber 51 would normally be equipped with protected illumination and fire protection, neither of which are shown.

Paddle 44 is rotated at high speed by a shaft 53 which is driven by a drive motor 11 (FIG. 1), and which is supported by bearings 54 protected by seals 55. Baffles 56 redirect and recycle the particulate trash thrown off by paddles 44 back into the main stream of incoming refuse introduced to the inner chamber 51 via chute 57 which is off-center of shaft 53. Chute 57 communicates with feed mechanism 12 through chute 20 as shown in FIG. 1.

Figure 7:
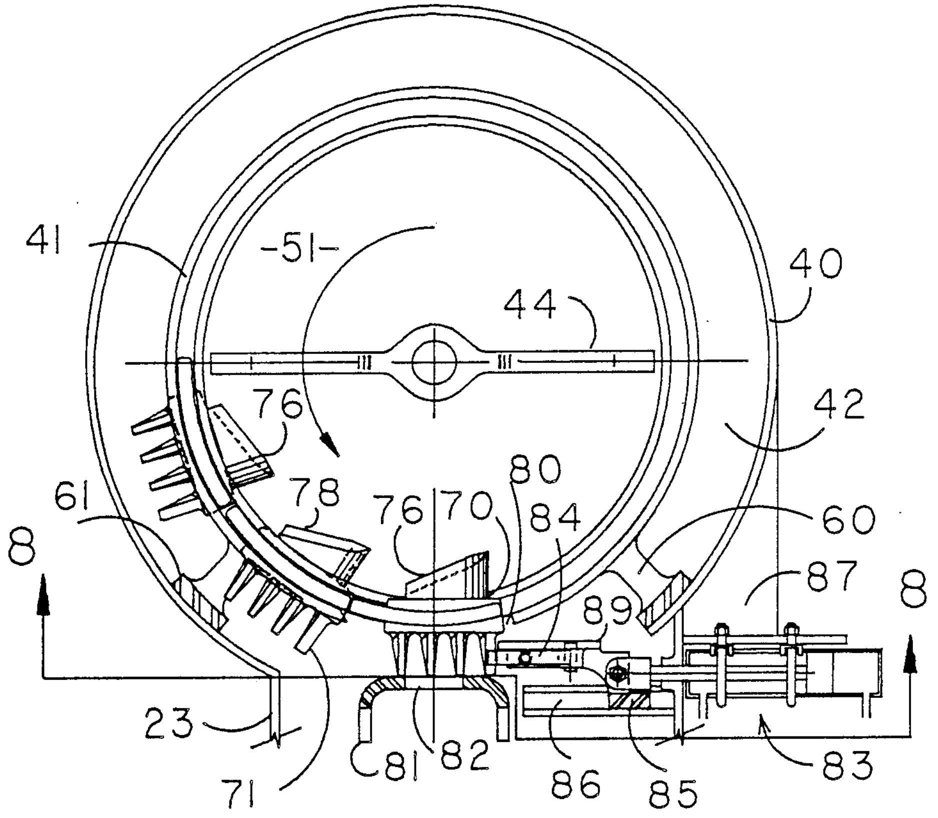
FIG. 7 is a partial sectional view taken substantially along line 7—7 of FIG. 2 showing the system used to replace the cutting edges without taking the unit out of service.

The cutting teeth 47 are segmental and continuously renewed into the system. Teeth 47 include guide arms 58 which fit within tracks 48 so that teeth 47 are guided therein. Teeth 47 are equipped with cooling fins 59 which extend into annulus 42 defined by outer housing 40. Outer housing 40 is positively positioned relative to working drum 41 by a plurality of stanchions 60 which extend from drum 41 to housing 40 to a plurality of vertical support ribs 61 (FIGS. 2 and 7). The segmental teeth are loosely fitted within tracks 48 so that air blown in through outlet 43 leaks into chamber 51 and out through outlet 52.

Segmental teeth 47 are shown in greater detail in FIGS. 3-6. The teeth are of two varieties, being of the left hand cutting and right hand cutting types, with FIGS. 3A and FIGS. 3B showing left and right hand elevational views, respectively; FIGS. 4A and 4B showing the left and right hand teeth, respectively, as seen from the center of shredder 10; and FIGS. 5A and 5B showing the left and right hand teeth, respectively, as seen from annulus 42. The cooling fins 59 of teeth 47, which are generally shown in FIG. 2, are shown in more detail in FIGS. 3A and 3B. Some of the fins 59 are provided with indentations 70 to accommodate lifting and moving devices to be hereinafter described while other heavy fins 71 accommodate the devices that push the segmental teeth along the tracks 48 of FIG. 2. Cooling fins 59 are also provided with a bias cut 72 for the left hand bladed teeth and bias cut 73 for the right hand bladed teeth. As previously described, the guide arms 58 are supported by the tracks 48 of drum 41 and since tracks 48 are arcuate in nature, guide arms 58 are likewise curved and shaped at the leading edge 74 and trailing edge 75 in a manner to accommodate feed control mechanisms to be hereinafter described.

Figure 3A:
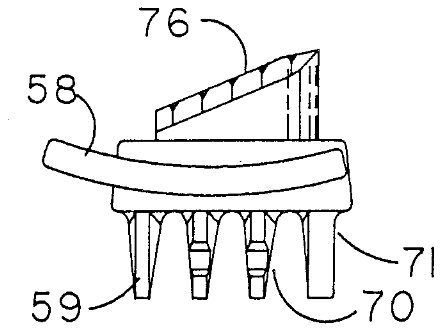
FIGS. 3A and 3B are elevational views of the left hand and right hand segmental cutting teeth, respectively, utilized in the shredding device according to the present invention.
Figure 3B:
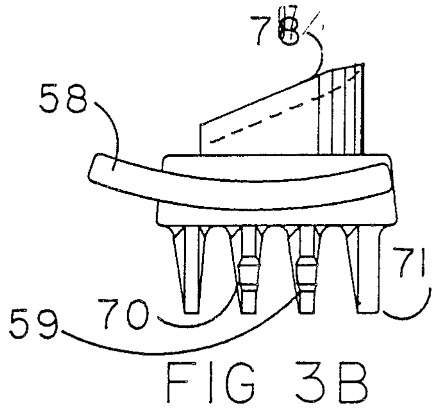
Figure 4A:
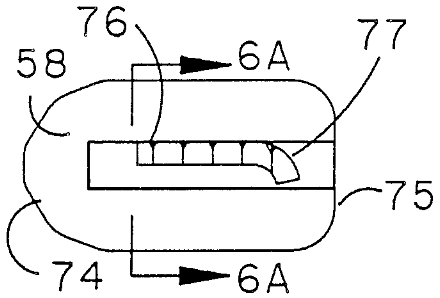
FIGS. 4A and 4B are elevational views of the segmental cutting teeth shown in FIGS. 3A and 3B, respectively, as they appear looking outwardly from the center of the shredding device.
Figure 4B:
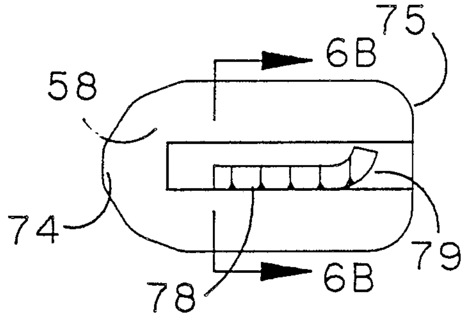
Figure 5A:
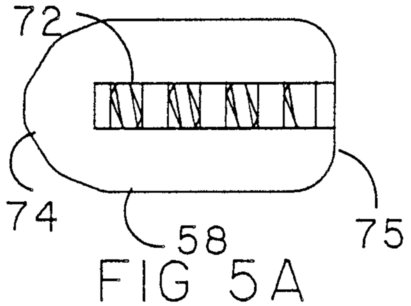
FIGS. 5A and 5B are elevational views of the segmented cutting teeth shown in FIGS. 3A and 3B, respectively, as they appear looking inwardly from the outer housing of the shredding device.
Figure 5B:
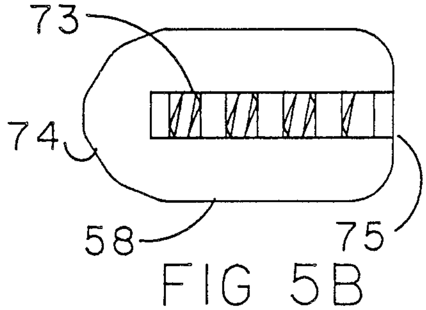
Figure 6A:
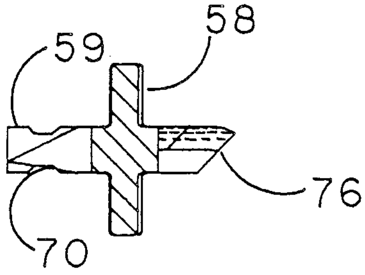
FIGS. 6A and 6B are sectional views taken substantially along lines 6A—6A and 6B—6B of FIGS. 4A and 4B, respectively.
Figure 6B:
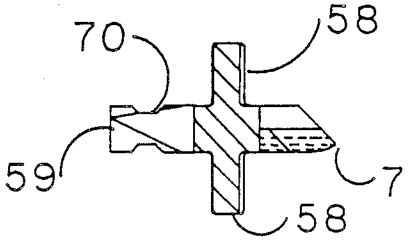

The cutting edge 76 of each left hand cutting tooth 47 is configured with air turning fins 77. Similarly the cutting edge 78 of each right hand cutting tooth 47 is configured with turning air fins 79 to enhance turbulence in the inner working shredding chamber 51. The cutting edges 76 and 78 as shown in FIGS. 3A and 3B, respectively, preferably have an angle of repose of less than 45 degrees to the direction of motion of the paddle lugs 46. Lugs 46 pass a left handed cutting edge 76 and a right handed cutting edge 78 alternatively to produce a saw-like effect on the trash moving at high speed through the inner working chamber 51.

Figure 8:
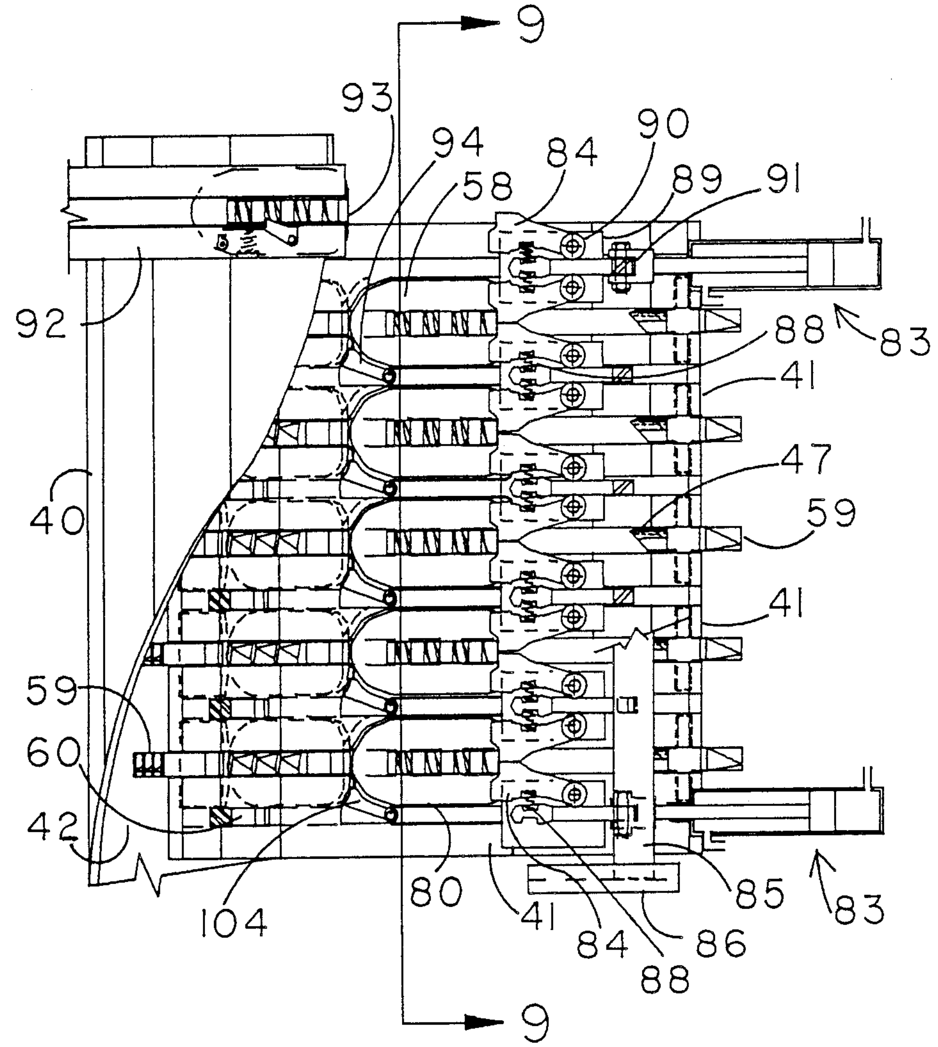
FIG. 8 is a somewhat schematic sectional view taken substantially along line 8—8 of FIG. 7.

While the feeding of blades to and their withdrawal from the system could be a manual operation, an automated method of feeding and controlling the segmental teeth is best shown in FIGS. 7 and 8. In FIG. 7 the alternating segmental left and right hand teeth are shown in an overhead view in a track 48 of drum 41. Although only three teeth are shown for simplicity, it should be appreciated that each track 48 is always filled with a full complement of teeth. As previously indicated, drum 41 is supported by stanchion 60 and vertical rib 61 which allows clearance for the passage of the segmental tooth. The rotating paddle 44 is shown as being rotated in a counterclockwise direction causing refuse to be thrown against the teeth 47. The outer face of the tracked drum 41 is interrupted, as at 80 to allow for the insertion or removal of a segmental tooth 47 into or out of a circular track 48. The particular tooth 47 currently at the location of interruption 80 is held in place against the impacting refuse in chamber 51 by a shoe 81 which is vertically continuous over all the teeth in that particular column. Apertures 82 are cut in shoe 81 to access the teeth for insertion or removal.

When a segmental tooth 47 has been inserted, it is advanced into the tracked drum 41 by a hydraulic unit generally indicated by the numeral 83 which engages the heavy cooling fins 71 of the segmental tooth through pushing jaws 84. Jaws 84 for all the teeth in the insertion/removal column are tied together by a bar 85 sliding in a track 86. The hydraulic assembly 83 is supported from housing 40 and access housing 23 by welded plates 87.

In FIG. 8 the internal chamber segmental tooth feed is shown behind the holding shoe 81 of FIG. 7. The housing 40 is shown cutaway as is the bar 85. In this view the opening 80 in the outer face of drum 41 is shown accommodating the extraction or insertion of a tooth 47. The pushing jaws 84 are shown having been advanced to just make contact with heavy cooling fin 71. The pressure against this fin is maintained by the adjacent jaws 84 which are spring loaded, as at 88, to accommodate the temporary opening of the jaw as it is retracted to the right to pass the segmental tooth that was forced forward from the thrust acting around the tracked drum 41. The jaw assemblies 84 typically include a bottom plate 89, a pivot 90 and a vertical bar 91 attached to bar 85. With this jaw assembly retracted to the right, the tooth 47 is fully exposed by opening 80 and can be manipulated.

The top and bottom tracks 48 are thus opened to accommodate magazines of segmental teeth. The upper magazine 92 is shown in FIG. 8 with a spent tooth 93 pushed into position by a previous cycle of jaws 84. On that previous cycle, jaws 84 pushed teeth 47 past spring loaded nonreturn cams 94 which hold the teeth advanced into the pressure of refuse impacting on the cutting blades 76 and 78 as is evident in FIG. 7. The shape of the leading edge 74 and trailing edge 75 of arms 58, as previously described, permits its interaction with nonreturn cam 94. In this condition the unit is ready for an insertion of a fresh tooth and the extraction of a spent tooth by the mechanism displayed in FIG. 9.

Figure 9:
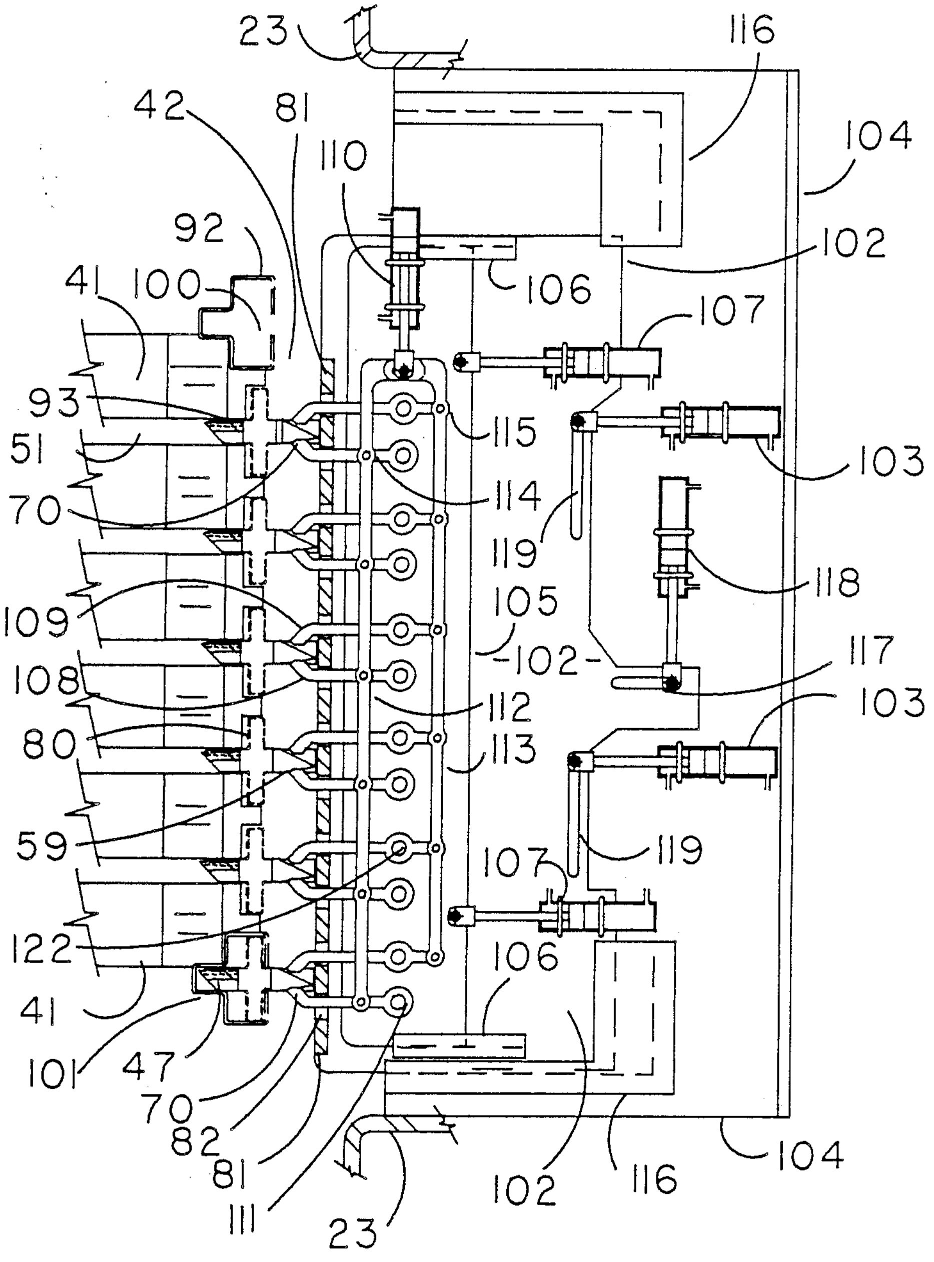
FIG. 9 is a somewhat schematic sectional view taken substantially along line 9—9 of FIG. 8 and showing the details of the mechanism which moves the blades.

FIG. 9 is an elevational section through access opening 80 in tracked drum 41. At the top is the spent tooth magazine 92 with an empty chamber 100 ready to receive the spent tooth 93. At the bottom of the section is a magazine 101 with a fresh tooth 47 ready for insertion. The teeth are pressed against the flow of shredding trash by shoe 81 which is supported by a primary moving plate 102. Plate 102 is pressed in place by hydraulic units 103 which are supported by a fixed plate 104 which in turn is supported by the access housing 23.

When the time arrives when it is necessary to effect a cycle to extract a spent tooth and insert a fresh tooth, a secondary movable plate 105 mounted on the primary movable plate 102 by slides 106 is advanced by hydraulic units 107. This advances tongs 108 and 109 through the access openings 82 in shoe 81 until they are aligned with notches 70 in the specialized purpose cooling fins 59. At this point hydraulic unit 110 mounted on the secondary movable plate 105 retracts causing the tongs 108 and 109 to engage their respective fins at notch 70. Tongs 108 and 109 are thus caused to turn on pivots 111 through linkages 112 and 113 acting through pins 114 and 115, all of which are mounted on the secondary plate 105 through pivots 111. With the tongs 108 and 109 engaged, including the tongs extracting a fresh tooth 47 from magazine 101, the primary plate 102 is retracted to the right by the action of hydraulic units 103 guided by slots 116 secured to fixed plate 104. The entire secondary plate 105 together with the tongs, gripped segmental teeth and shoe 81 move with the primary movable plate 102. Slotted hole 117 allows this movement to occur without causing a hydraulic unit 118 to turn or be disturbed from its fixed mounting on plate 104. With the segmental teeth 47 thus removed from the opening slot in drum 41, the positive air pressure in annulus 42 compared to the negative air pressure in chamber 51 causes dust and trash to be contained in chamber 51 and away from the mechanism of FIG. 9.

Once the extraction of the battery of segmental teeth is clear of tracks 48 in drum 41, the primary plate 102 is caused to move upward by the action of hydraulic unit 118. This movement is permitted by the slotted holes 119 and the "L" shaped nature of guide slots 116. With the primary plate 102 thus moved upward, each segmental tooth is in readiness to be inserted in its next higher respective circular track 48, and the oldest tooth 93 is ready to be inserted into the spent tooth magazine 92. Such is accomplished by the actuation of hydraulic units 103 which move primary plate 102 to the left in FIG. 9. Tongs 108 and 109 are then disengaged from the fins by the action of hydraulic unit 110 and the tongs retracted to the right by hydraulic units 107. The shoe 81 retracts downward by the action of hydraulic unit 118 and the assembly is ready for the next exchange cycle.

Figure 10:
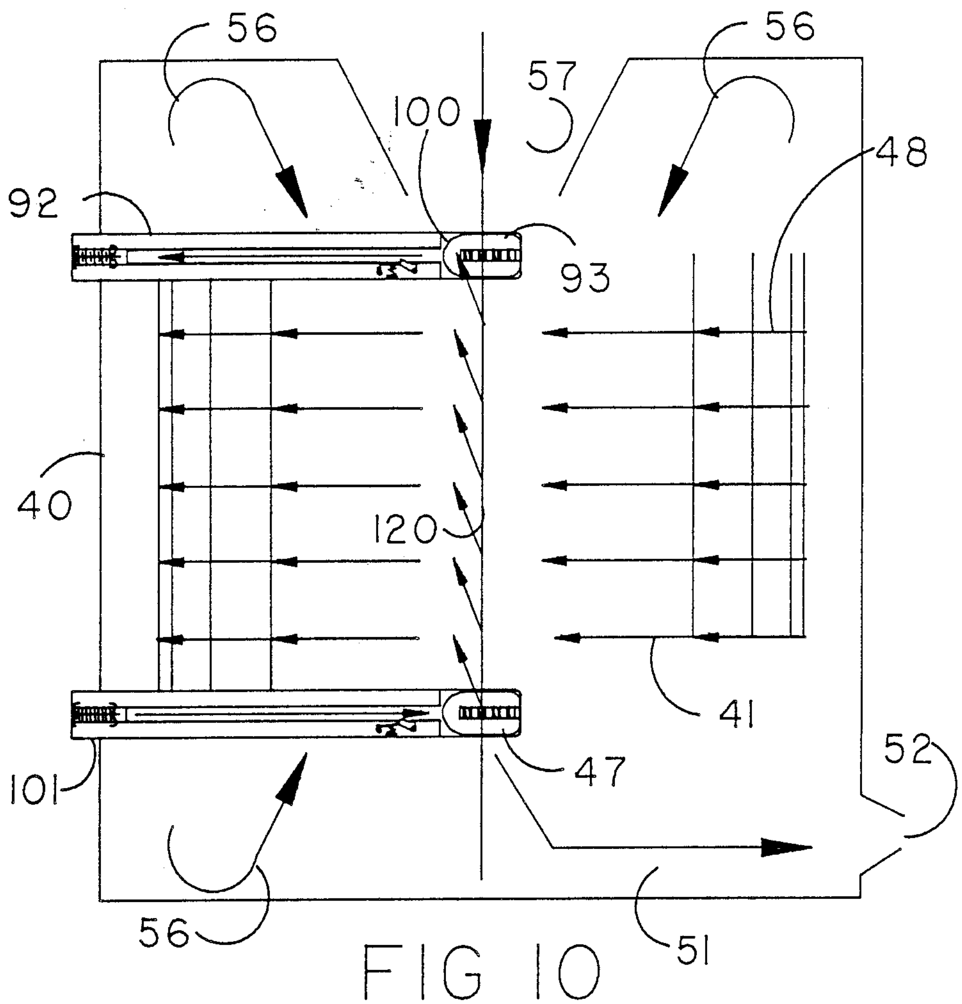
FIG. 10 is a simplified schematic of the segmental tooth movement pattern.

These cycles of FIGS. 7, 8 and 9 are summarized in schematic form in FIG. 10. Shown are the outer housing 40, the inner chamber 51, inlet 57, recirculation baffles 56, and outlet 52. A new segmental tooth 47 is fed into the system by magazine 101. The mechanism of FIG. 9 lifts all the teeth in the exposed column 120 up one circular track respectively. The pushing jaws of FIG. 8 then advance to the left all the segmental teeth around the circular tracks 48 by a distance of one tooth, replacing the tooth just placed in the open vertical column 120 with the tooth that was to the right of that column. In this manner a new tooth moves into the lowest track, around that track, up to the next track, around that track, moving ever upward, until it finally reaches the end of the upper track where it will be in its dullest condition. The active refuse within chamber 51, although being intensively internally recirculated, is generally moving downward. Thus the oldest and dullest teeth can be seen to do the initial tearing of the roughly macerated refuse, and the newest sharpest teeth do the final cutting on the refuse. Since the oldest tooth is constantly being removed and replaced by a new tooth, the average sharpness of the blades of the overall system is maintained.

Figure 11:
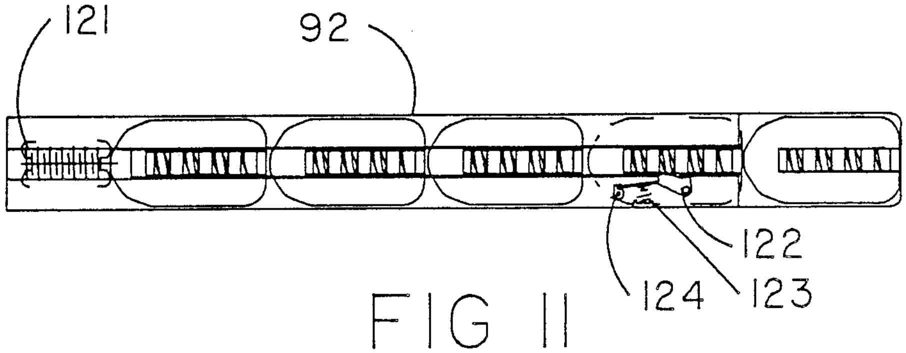
FIG. 11 is a somewhat schematic view showing the details of the tooth storage magazine.

FIG. 11 is a top view of a typical magazine 92 or 101 which like the magazine of a rifle is equipped with a feeding spring and cover 121, and a retaining latch 122 with a feeding spring 123 that prevents a loaded tooth from sliding out of the magazine when it is being used for spent teeth. The latch 122 can be restrained by latch 124 when the magazine is being used to feed fresh teeth.

It should be appreciated that the objects of the present invention are accomplished by the trash shredder just described thereby substantially improving the art.

We claim:

1. A method of maintaining the average overall sharpness of the blades in a shredding device, the blades being movable around vertically spaced circular tracks, with new blades to be received by the first of the tracks and old blades to be removed from the last of the tracks, comprising the steps of removing the oldest of the blades from each vertically spaced track, positioning the removed blades adjacent to the next adjacent track closest to the last track while at the same time positioning a new blade adjacent to the first track, and inserting the removed blades into the next adjacent tracks closest to the last track while at the same time inserting the new blade into the first track and discharging the oldest blade from the last track from the device.

2. A method according to claim 1 further comprising the step of moving the blades around each of the vertically spaced tracks prior to the step of removing the oldest of the blades from each vertically spaced track.

3. A method according to claim 1 wherein the step of removing the oldest of the blades from each vertically spaced track includes the step of removing a blade from a new blade supply source.

4. A method according to claim 1 wherein the step of positioning the removed blades adjacent to the next adjacent track includes the step of positioning the oldest blade from all the tracks adjacent to a discharge area.

5. A method according to claim 1 wherein the first of the tracks is the lowest track and the last of the tracks is the highest track and including the step of introducing trash or the like to the shredding device adjacent to the highest vertical track.

6. A method of maintaining the average overall sharpness of the blades in a trash shredding device, the blades being segmented, comprising the steps of inserting a new segmented blade into the device, and at the same time removing the segmented blade from the device which has been in the device for the longest period of time.

7. A method according to claim 6 wherein the segmented blades are positioned in a plurality of vertically spaced tracks, the new segmented blade having been inserted into the first of the tracks and the removed segmented blade having been removed from the last of the tracks, further comprising the step of transferring the blades which have been in each track for the longest period of time to the next adjacent track closest to the last track.

8. A method according to claim 7 further comprising the step of moving the segmented blades around each of the tracks prior to the step of transferring the blades.

9. A method according to claim 8 wherein the first of the tracks is the lowest track and the last of the tracks is the highest track and including the step of introducing a material to be shredded into the shredding device adjacent to the highest vertical track.

10. A method according to claim 9 further comprising the step of removing the shredded trash adjacent to the lowest vertical track.

11. A shredding device comprising an annular drum, vertically spaced tracks in said annular drum, a plurality of blade members positioned in each of said vertically spaced tracks, means to move said blade members around said vertically spaced tracks, means to extract and insert said blade members out of and into said tracks, and means to move the blade members extracted from one said vertically spaced track to a position adjacent to the adjacent said vertically spaced track.

* * * * *

UNITED STATES PATENT AND TRADEMARK OFFICE

CERTIFICATE OF CORRECTION

PATENT NO. : 4,985,976

DATED : January 22, 1991

INVENTOR(S) : James A. Titmas and Phillip J. Flauto

It is certified that error appears in the above-identified patent and that said Letters Patent is hereby corrected as shown below:

Column 8, line 9, claim 6, line 2, delete the word "trash".

Column 8, line 33, claim 10, line 2, delete the word "trash" and substitute therefor the word --material--.

Signed and Sealed this

Second Day of March, 1993

Attest:

STEPHEN G. KUNIN

Attesting Officer

Acting Commissioner of Patents and Trademarks